(12) United States Patent
Kim

(10) Patent No.: US 8,753,506 B2
(45) Date of Patent: Jun. 17, 2014

(54) APPARATUS FOR FILTERING SEWAGE AND WASTEWATER

(75) Inventor: Heon Mok Kim, Daegu (KR)

(73) Assignee: Essa Co., Ltd., Gyeongsangbuk-do (KR)

( * ) Notice: Subject to any disclaimer, the term of this patent is extended or adjusted under 35 U.S.C. 154(b) by 266 days.

(21) Appl. No.: 13/194,685

(22) Filed: Jul. 29, 2011

(65) Prior Publication Data

US 2012/0175294 A1 Jul. 12, 2012

(30) Foreign Application Priority Data

Jan. 11, 2011 (KR) .................. 10-2011-0002632

(51) Int. Cl.
| | | |
|---|---|---|
| *E02F 5/14* | (2006.01) | |
| *E02B 8/02* | (2006.01) | |
| *E03F 5/14* | (2006.01) | |
| *B01D 33/00* | (2006.01) | |
| *B01D 33/04* | (2006.01) | |
| *B01D 33/056* | (2006.01) | |
| *B01D 33/46* | (2006.01) | |
| *B01D 33/76* | (2006.01) | |
| *B01D 33/327* | (2006.01) | |

(52) U.S. Cl.
CPC ... *E02B 8/02* (2013.01); *E03F 5/14* (2013.01); *B01D 33/0064* (2013.01); *B01D 33/04* (2013.01); *B01D 33/056* (2013.01); *B01D 33/327* (2013.01); *B01D 33/466* (2013.01); *B01D 33/76* (2013.01); *B01D 2201/08* (2013.01)
USPC ........... 210/155; 210/158; 210/159; 210/160; 210/330; 210/332; 210/393; 210/396

(58) Field of Classification Search
USPC ................ 210/155, 158, 159, 160, 330, 332, 210/333.01, 391, 393, 396, 400
See application file for complete search history.

(56) References Cited

U.S. PATENT DOCUMENTS

| | | | | |
|---|---|---|---|---|
| 4,302,331 | A * | 11/1981 | Condit, Jr. .................... | 210/160 |
| 4,447,324 | A * | 5/1984 | Jackson ........................ | 210/159 |
| 4,518,494 | A * | 5/1985 | Jackson ........................ | 210/158 |
| 5,102,536 | A * | 4/1992 | Wiesemann .................. | 210/158 |
| 5,501,793 | A * | 3/1996 | Cheesman et al. ............ | 210/160 |
| 5,800,701 | A * | 9/1998 | Larsen ......................... | 210/158 |
| 6,187,184 | B1 * | 2/2001 | Reetz et al. ................... | 210/155 |
| 7,575,674 | B2 * | 8/2009 | Chang .......................... | 210/158 |
| 2005/0035064 | A1 * | 2/2005 | Seidl ............................ | 210/160 |
| 2007/0095730 | A1 * | 5/2007 | Chuang ........................ | 210/155 |

* cited by examiner

Primary Examiner — Christopher Upton
(74) Attorney, Agent, or Firm — Rabin & Berdo, P.C.

(57) ABSTRACT

Disclosed herein is an apparatus for filtering sewage and wastewater. The filtering apparatus has a vertical structure including a filtering belt comprising a filter bag or a filter mesh that can filter out fine impurities. For this, the filtering apparatus includes a drive motor that receives power to drive the apparatus, an upper drive drum that is operated by the drive motor, a lower rotating drum that is interlocked with the upper drive drum, and a filtering belt that is wound and rotated around the upper drive drum and the lower rotating drum. The filtering apparatus cannot only filter out fine impurities less than from 0.1 mm to 0.2 mm but also separate earth and sand, unlike conventional filtering apparatuses that cannot conduct them. Furthermore, because the filtering apparatus can be placed upright or inclined at a predetermined angle, it can be used in a water inlet passage that is 4 m to 5 m underground, and impurities filtered out from water can be transferred to a height higher than 10 m above ground.

18 Claims, 14 Drawing Sheets

Fig.1A Prior Art
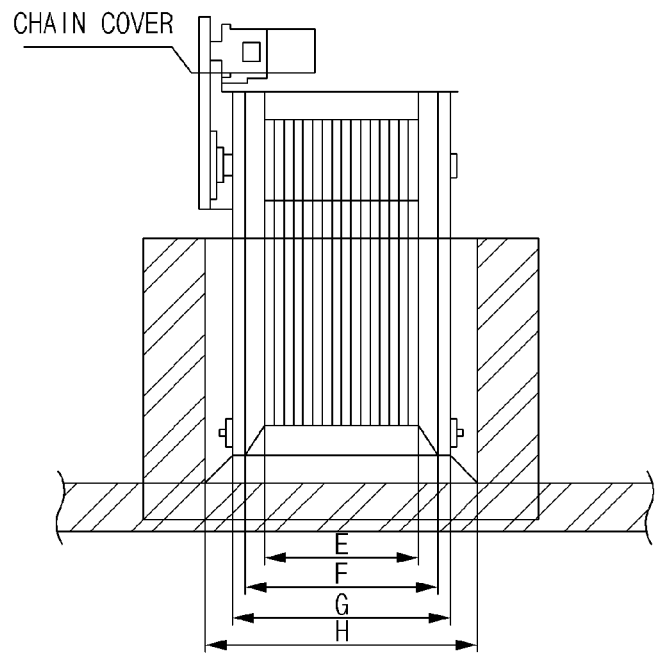
Fig.1B Prior Art
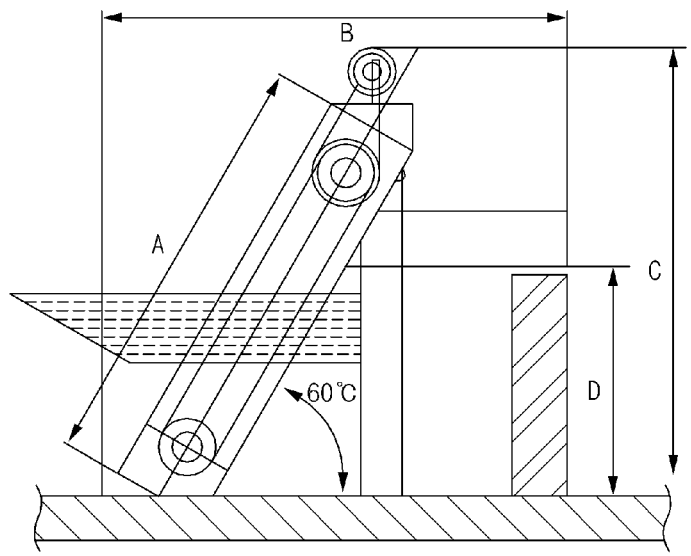

Fig.2A Prior Art
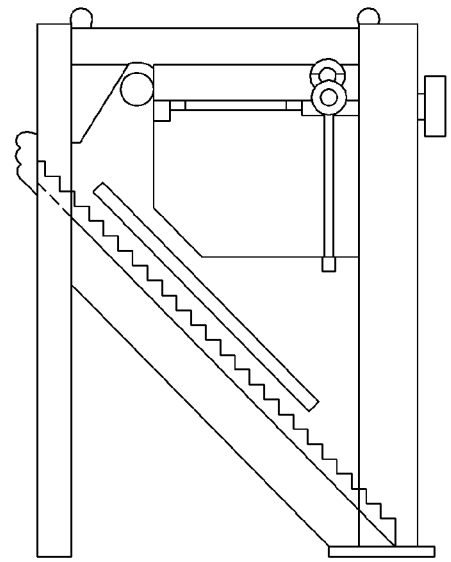
Fig.2B Prior Art
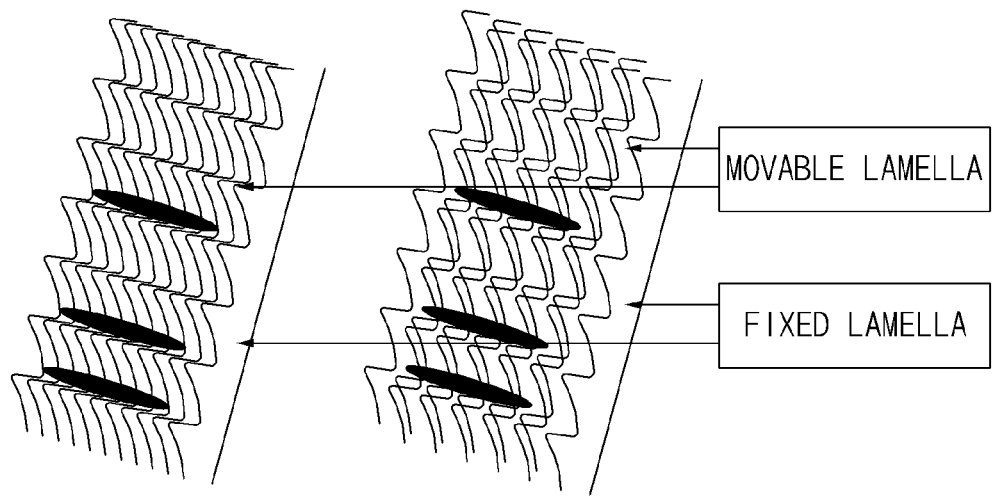

Fig.4 Prior Art air sent under pressure

APPARATUS FOR FILTERING SEWAGE AND WASTEWATER

BACKGROUND OF THE INVENTION

1. Field of the Invention

The present invention relates generally to apparatuses for filtering sewage and wastewater to remove fine impurities therefrom and, more particularly, to an apparatus for filtering sewage and wastewater that has a vertical structure, including a filtering belt comprising a filter bag or a filter mesh that can filter out fine impurities.

2. Description of the Related Art

Generally, filters are installed in sewage and wastewater inlet passages of sewage and wastewater disposal plants to filter out impurities, earth, sand, floating waste, etc. which are drawn into the inlet passages along with sewage and wastewater.

At present, to filter out impurities, earth, sand, floating waste, etc. that are drawn into the inlet passages of the sewage and wastewater plants, apparatuses for filtering sewage and wastewater, such as filter nets, auto-bar screens, step screens, vertical-screw screens, etc., have been used in the inlet passages. However, such conventional apparatuses are problematic in that it is difficult to filter out fine impurities, thin thread or fiber yarn shaped foreign substances (hair, strings), etc.

FIG. 1A is a side view of a conventional auto-bar screen. FIG. 1B is a view showing an embodiment of the installation of the auto-bar screen. The auto-bar screen is an apparatus that is most widely used and is operated in such a way that impurities that are filtered out when drawn sewage and wastewater passes through a screen part are taken out of the sewage and wastewater by a rake connected to a drive chain and then transferred into a collection container. The auto-bar screen is inexpensive, and installation cost thereof is comparatively low. However, it is difficult to filter out fine impurities, earth and sand. Hence, most impurities having thin and long shapes pass through the auto-bar screen and enter a sewage and waste water disposal plant, thus causing breakdown of equipment and a piping system that are used in the sewage and wastewater disposal plant.

Furthermore, when a sewage and wastewater inlet passage is deeper than from 4 m to 5 m underground, it is difficult to install the auto-bar screen. In cases where the auto-bar screen is installed at a comparatively deep position, a separate machine room is required, thus resulting in an increase in the installation cost.

FIG. 2A is a side view illustrating a conventional step screen. The step screen was proposed to mitigate the problems of the auto-bar screen. The step screen includes several tens of fixed lamellas and movable lamellas which are formed in a step shape. One movable lamella is placed between each fixed lamella, and the fixed lamellas and the movable lamellas are separately tied, thus forming two screens, that is, a fixed screen and a movable screen. FIG. 2B illustrates an embodiment of the lamellas of the step screen.

The step screen is superior to the auto-bar screen in a function of filtering out fine impurities. However, it still is not easy to filter out impurities of 1 mm or less or foreign substances, such as long fiber yarns. Furthermore, in cases where the step screen is installed in a sewage and wastewater inlet passage that is underground, the initial installation cost of the step screen increases, because a separate machine room is required.

FIG. 3 is a side view of a conventional vertical-screw screen, particularly, in which only a lower portion thereof is illustrated by a partially broken sectional view. In an effort to overcome the problem of the auto-bar screen or the step screen that requires a separate underground machine room, the vertical-screw screen was proposed. The vertical-screw screen is the same as that of a typical screw screen and is suitable for a limited underground place, such as a water passage under a manhole, which cannot have a screen room. However, in the case of the vertical-screw screen, because a gap between a cylindrical housing and a screw ranges 5 mm to 6 mm, impurities smaller than from 5 mm to 6 mm cannot be filtered out, and it is also difficult to filter out earth and sand.

FIG. 4 is a front view illustrating a conventional wedge drum screen. Unlike first stage equipment for wastewater treatment to remove solid bodies and sludge from industrial waste water or dishwater, or unlike conventional sieve screens or drum screens, the wedge drum screen has great performance in removing even fine particles depending on the size of the opening of a mesh.

However, in the case of the wedge drum screen, the cost of equipment is high, and a large impurity removal apparatus, such as an auto-bar screen or the like, must be installed ahead of the wedge drum screen to filter out large impurities. Furthermore, the wedge drum screen is disadvantageous in that it cannot be directly installed in a waste water inlet passage, so that when filtering inlet wastewater, a separate pump is required to pump inlet wastewater and supply it to the wedge drum screen.

SUMMARY OF THE INVENTION

Accordingly, the present invention has been made keeping in mind the above problems occurring in the prior art, and an object of the present invention is to provide an apparatus for filtering sewage and wastewater that cannot only filter out fine impurities and foreign substances, such as very thin fiber yarns, but also separate earth and sand.

Another object of the present invention is to provide an apparatus for filtering sewage and wastewater to remove fine impurities therefrom that can be installed and used even when an inlet passage for sewage and wastewater is present 4 m to 5 m underground, and that does not require a separate device for filtering out large impurities.

In order to accomplish the above object, the present invention provides an apparatus for filtering sewage and wastewater, including a drive motor receiving power to drive the apparatus, an upper drive drum operated by the drive motor, a lower rotating drum interlocked with the upper drive drum, and a filtering belt wound and rotated around the upper drive drum and the lower rotating drum.

The drive motor may include a decelerator for reducing speed thereof.

The upper drive drum may be movable upwards or downwards and have a chain.

The lower rotating drum or the filtering belt may have the chain.

The filtering belt may include a plurality of buckets provided at positions spaced apart from each other at regular intervals. Each of the buckets may comprise a fine perforated plate or a fine filter mesh.

The apparatus may further include an upper frame having the upper drive drum therein, a lower frame having the lower rotating drum, and at least one connection frame connecting the upper frame to the lower frame.

The apparatus may further include a discharge guide unit provided on a first side surface of the upper frame so as to be rotatable, and a discharge guide pipe through which impurities discharged by the discharge guide unit pass. The apparatus may further include an air blowing unit provided on a second side surface of the upper frame to send air under pressure.

The discharge guide unit may rotate and strike the filtering belt to remove the impurities from the filtering belt. The air blowing unit may include a blowing nozzle discharging the air sent under pressure toward the filtering belt to remove the impurities from the filtering belt.

The lower frame may have at least one opening into which the sewage and wastewater required to filter out the impurities therefrom is drawn. The apparatus may further include a support for supporting the apparatus.

BRIEF DESCRIPTION OF THE DRAWINGS

The above and other objects, features and advantages of the present invention will be more clearly understood from the following detailed description taken in conjunction with the accompanying drawings, in which:

FIG. 1A is a side view illustrating a conventional auto-bar screen;

FIG. 1B is a view illustrating an embodiment of the installation of the auto-bar screen of FIG. 1A;

FIG. 2A is a side view illustrating a conventional step screen;

FIG. 2B illustrates an embodiment of lamellas of the step screen;

DESCRIPTION OF THE PREFERRED EMBODIMENTS

Hereinafter, preferred embodiments of the present invention will be described in detail with reference to the attached drawings. The terms and words used in the specification and claims must not be limited to typical or dictionary meanings, but must be regarded as concepts selected by the inventor as concepts that best illustrate the present invention, and must be interpreted as having meanings and concepts adapted to the scope and spirit of the present invention to aid in understanding the technology of the present invention.

Therefore, the construction of the embodiment illustrated in the specification and the drawings must be regarded as only one illustrative example, and these are not intended to limit the present invention. Furthermore, it must be understood that various modifications, additions and substitutions are possible at the point of time of application of the present invention.

Figure 3:
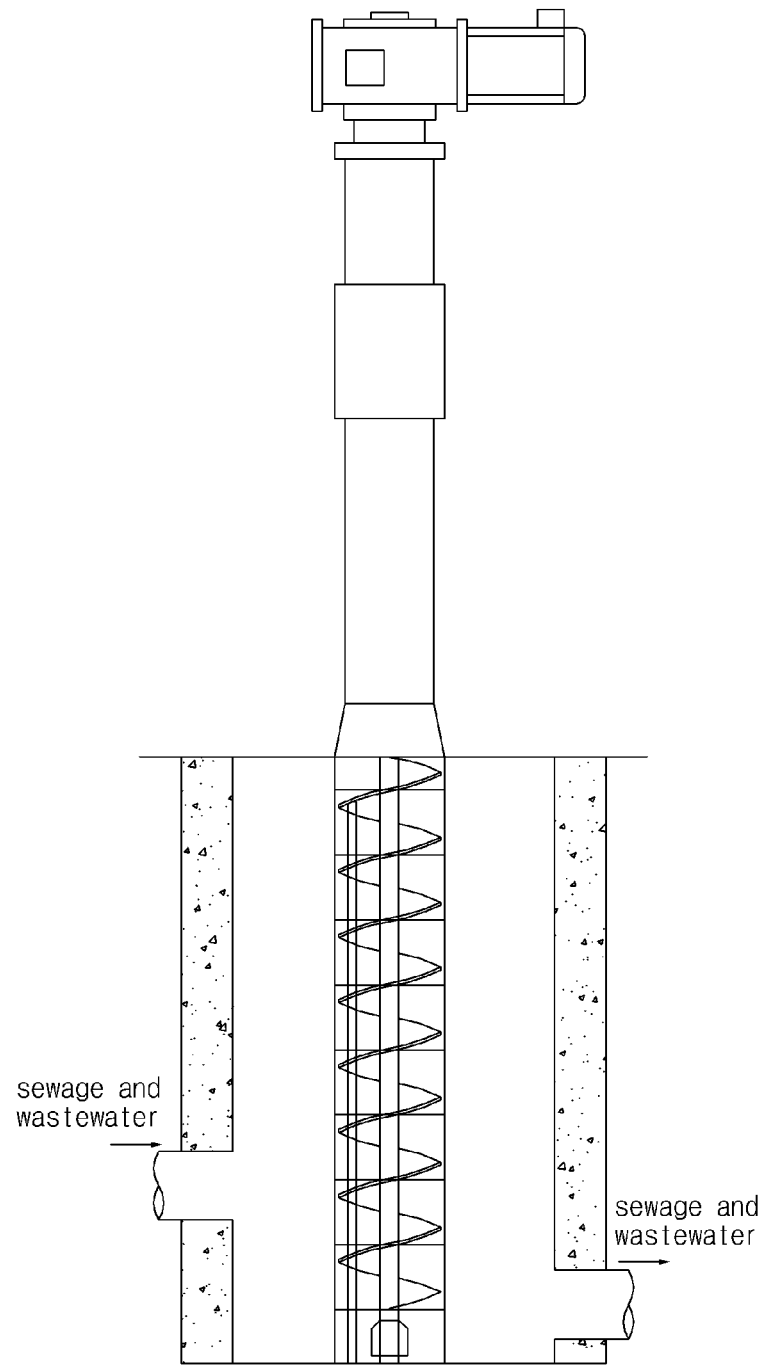
FIG. 3 is a side view illustrating a conventional vertical-screw screen.
Figure 4:
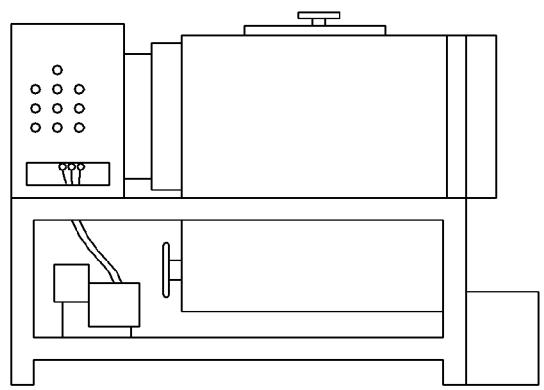
FIG. 4 is a front view illustrating a conventional wedge drum screen.
Figure 5:
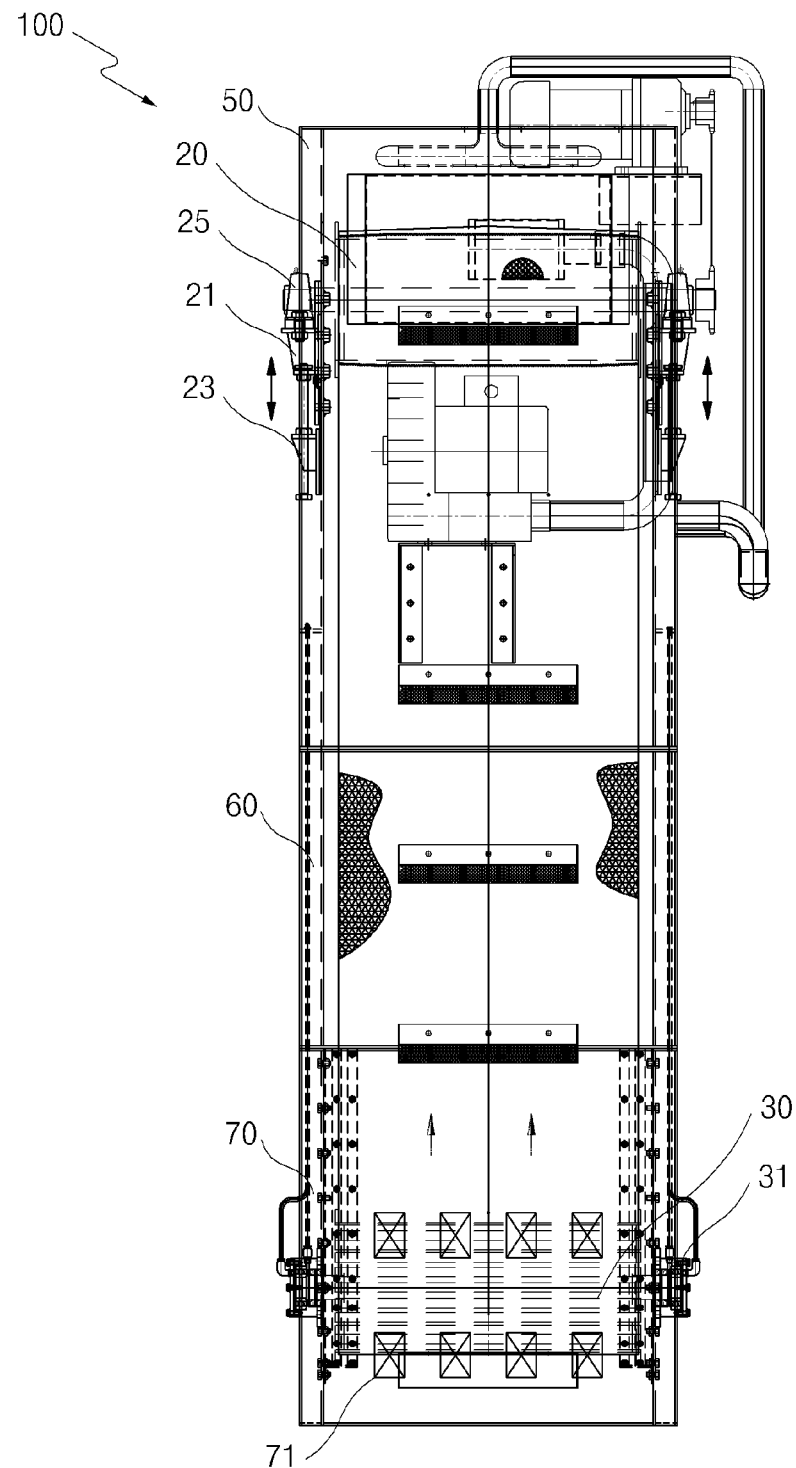
FIG. 5 is a front view illustrating an embodiment an apparatus for filtering sewage and wastewater, according to the present invention.
Figure 6:
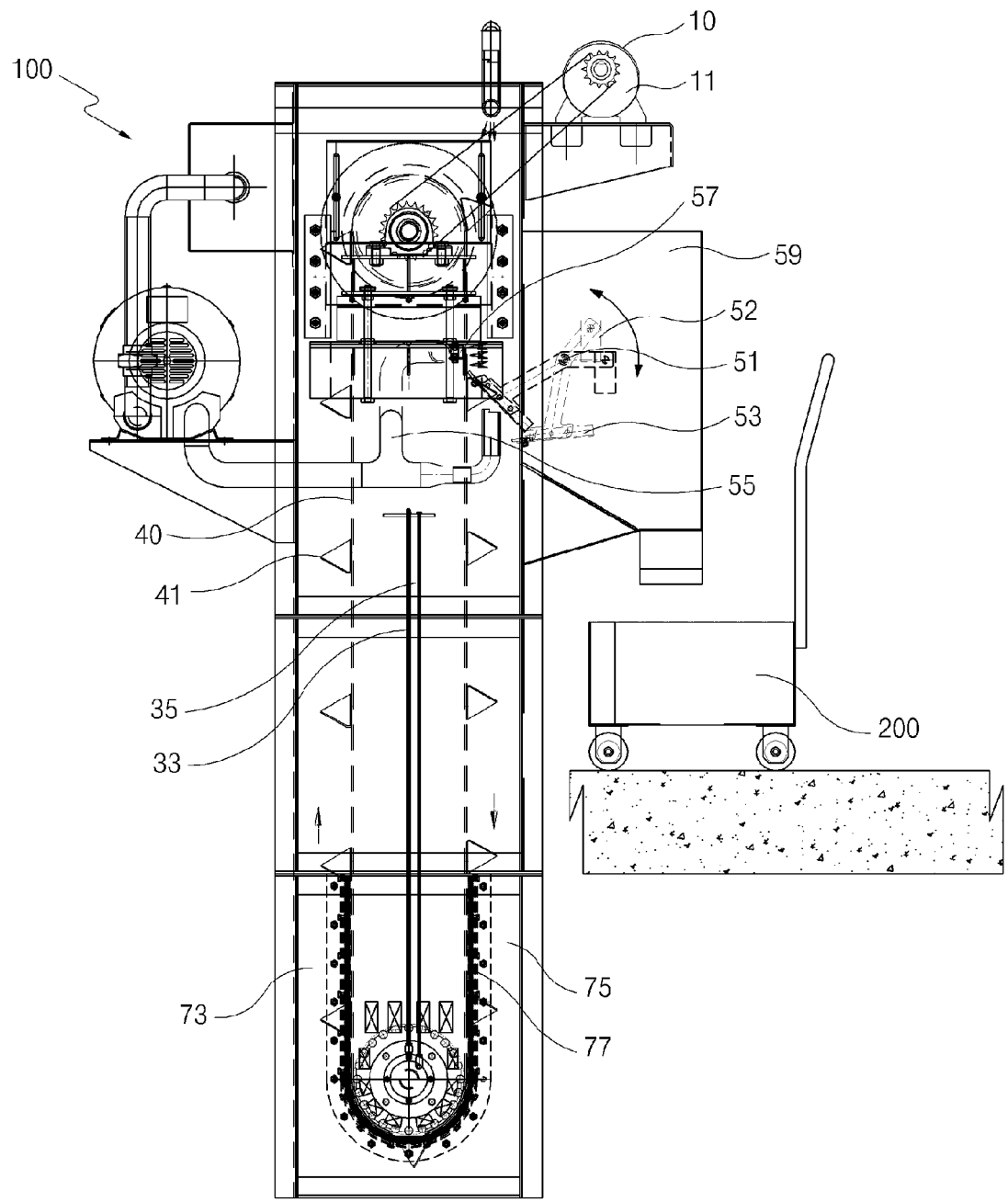
FIG. 6 is a side view of the filtering apparatus of FIG. 5.
Figure 7:
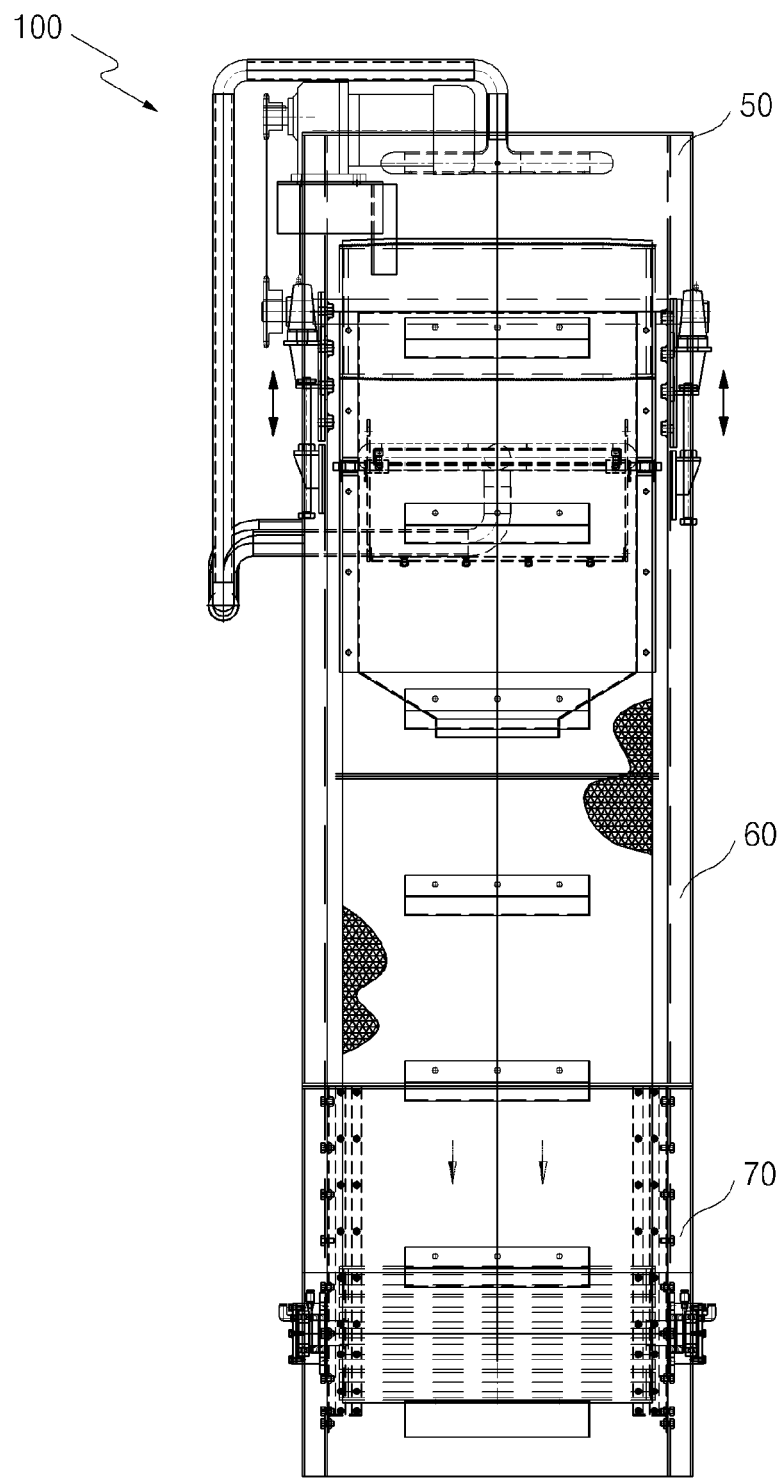
FIG. 7 is a rear view of the filtering apparatus of FIG. 5.
Figure 8:
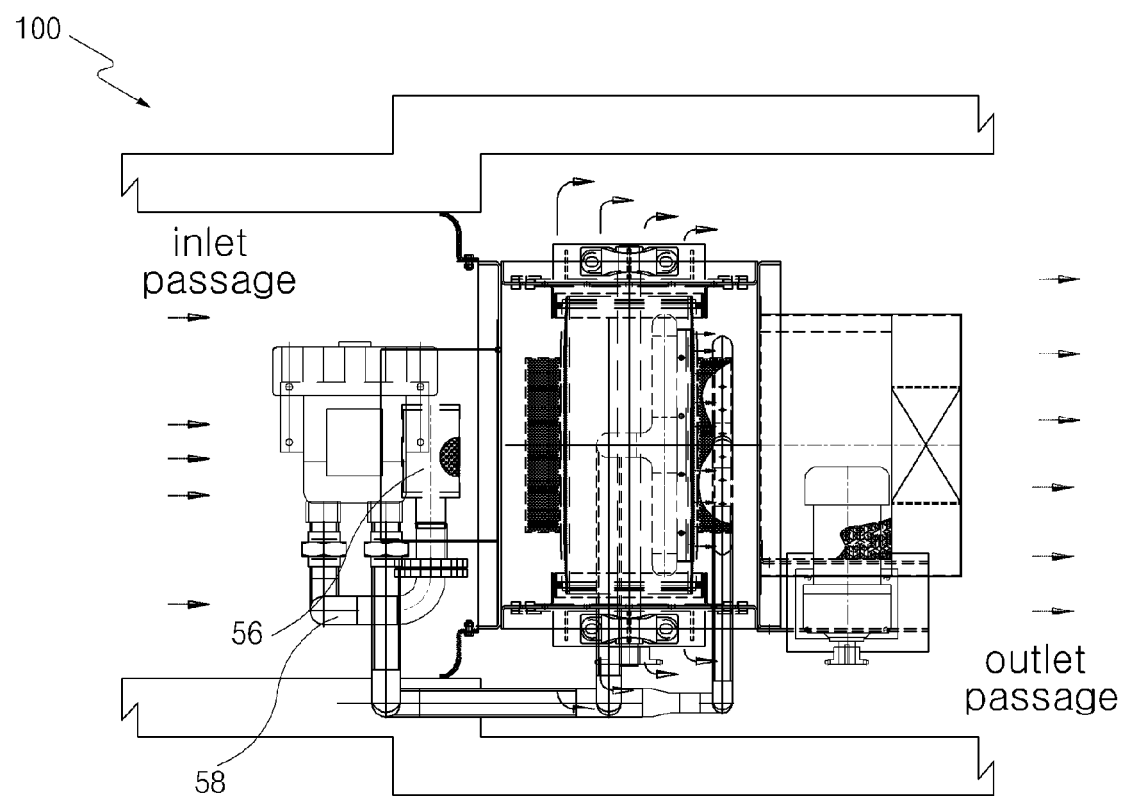
FIG. 8 is a plan view of the filtering apparatus of FIG. 5.

FIG. 5 is a front view illustrating an apparatus for filtering sewage and waste water, according to an embodiment of the present invention. FIG. 6 is a side view illustrating the filtering apparatus according to the present invention. FIG. 7 is a rear view of the filtering apparatus according to the present invention. FIG. 8 is a plan view of the filtering apparatus according to the present invention. Hereinafter, the filtering apparatus according to the present invention will be described in detail with reference to FIGS. 5 through 8.

The filtering apparatus 100 includes a drive motor 10 which receives power to drive the filtering apparatus 100, an upper drive drum 20 that is operated by the drive motor 10, a lower rotating drum 30 that is interlocked with the upper drive drum 20, and a filtering belt 40 that is wound around the upper drive drum 20 and the lower rotating drum 30 and rotated by the drums 20 and 30.

The upper drive drum 20 and the lower rotating drum 30 have cylindrical structures having predetermined sizes and respectively include an upper bearing box 25 and a lower bearing box 31 that contain therein bearings for embodying rotating motion. In particular, in the case of the lower bearing box 31 of the lower rotating drum 30, which is disposed under the surface of sewage and waste water, a bearing box oil seal is preferably installed in the lower bearing box 31 to prevent sewage and wastewater from entering a rotating portion of the bearing when the lower rotating drum 30 rotates, and the lower bearing box 31 is preferably covered with a bearing box cover so that sewage and waste water can be reliably prevented from entering the lower bearing box 31. Furthermore, an oiling tube 33 and a vent line 35 are preferably installed in the filtering apparatus 100 to facilitate oiling of the filtering apparatus 100 and removal of foreign substances when the filtering apparatus 100 is operated for a long period of time.

In addition, the filtering apparatus 100 further includes an upper frame 50 which contains the upper drive drum therein, a lower frame 70 which contains the lower rotating drum 30 therein, and at least one connection frame 60 which connects the upper frame 50 to the lower frame 70.

The connection frame 60 is configured such that the length thereof is adjustable or it can be replaced with another one depending on a depth or characteristics of an inlet passage for sewage and wastewater. For this, an outer frame comprises the upper frame 50 and the lower frame 70, rather than comprising a single body, and the connection frame 60 is disposed between the upper frame 50 and the lower frame 70 so as to be adjustable in length. In this embodiment, the connection frame 60 can be adjusted in length by changing the number thereof. Thus, the filtering apparatus 100 can be used in various places, for example, not only deep underground but also in a comparatively high place at ground-level. Furthermore, the filtering belt 40 only needs to be adjusted in length depending on the length of the connection frame 60. Hence, the adjustment in length of the filtering apparatus 100 can be facilitated. As such, the length of the filtering apparatus 100 of the present invention can be easily adjusted using the connection frame 60 and the filtering belt 40 in response to the characteristics of a sewage and wastewater disposal plant The drive motor 10 is coupled to a first side surface of the upper frame 50. The drive motor 10 operates the filtering apparatus 100 and, in more detail, operates the filtering belt 40 using power supplied from a power source. When the drive motor 10 is operated, the upper drive drum 20 which is interlocked with the drive motor 10 by a chain or belt is operated. When the upper drive drum 20 is operated, the filtering belt 40 is rotated by the operation of the upper drive drum 20 and, simultaneously, the lower rotating drum 30, which is interlocked with the upper drive drum 20 by the filtering belt 40, is also operated. To control the speed at which the filtering belt 40 rotates, the drive motor 10 may include a decelerator 11 that reduces the rotating speed of the drive motor 10. When the decelerator 11 rotates, the rotating speed of the drive motor 10 is adjusted by a chain of the decelerator 11 and the chain of the drive motor 10 so that the rotating speed of the filtering belt 40 can be controlled.

The filtering belt 40 which is wound around the upper drive drum 20 and the lower rotating drum 30 comprises a woven tamis having fine meshes or a mesh shape and wraps the upper drive drum 20 and the lower rotating drum 30 in an elliptical shape.

In the conventional technique, when the screen is manufactured, a filter bar or filter plate is selected in consideration of particle diameters of impurities. That is, a particle diameter of an impurity which can be filtered out is determined depending on the size of openings of the filter bar or the filter plate. After the particle diameter of an impurity that can be filtered out is determined when the screen is manufactured, it cannot be changed while the screen is used. However, in the present invention, because the filtering belt 40, which determines the performance of filtration, can be replaced with another one depending on conditions of sewage and wastewater, the particle diameter of an impurity that can be filtered out can be easily controlled, and the performance of filtration can be controlled as necessary.

Furthermore, the filtering belt 40 is rotated by the upper drive drum 20 and the lower rotating drum 30. Although the filtering apparatus 100 is installed in the vertical direction or in an inclined direction, the filtering belt 40 can maintain appropriate tension, because the upper drive drum 20 can move upwards or downwards. In addition, the filtering belt 40 is configured such that sewage and wastewater drawn into the front opening of the lower frame 70 flows from a front filtering portion 73 to a rear filtering portion 75 through a lower portion of the filtering belt 40 which comes into directly contact with sewage and waste water in the lower frame 70 to conduct the filtration. Therefore, the area with which sewage and waste water is filtered by the filtering belt 40 is increased. Moreover, a brush 77 made of smooth fiber yarns is provided to prevent impurities from entering sides of the filtering belt 40. The brush 77 covers a linear portion and a round portion of the filtering belt 40 to a predetermined height greater than the treatment surface of sewage and wastewater. Thus, impurities can be reliably prevented from entering the filtering belt 40.

Figure 9:
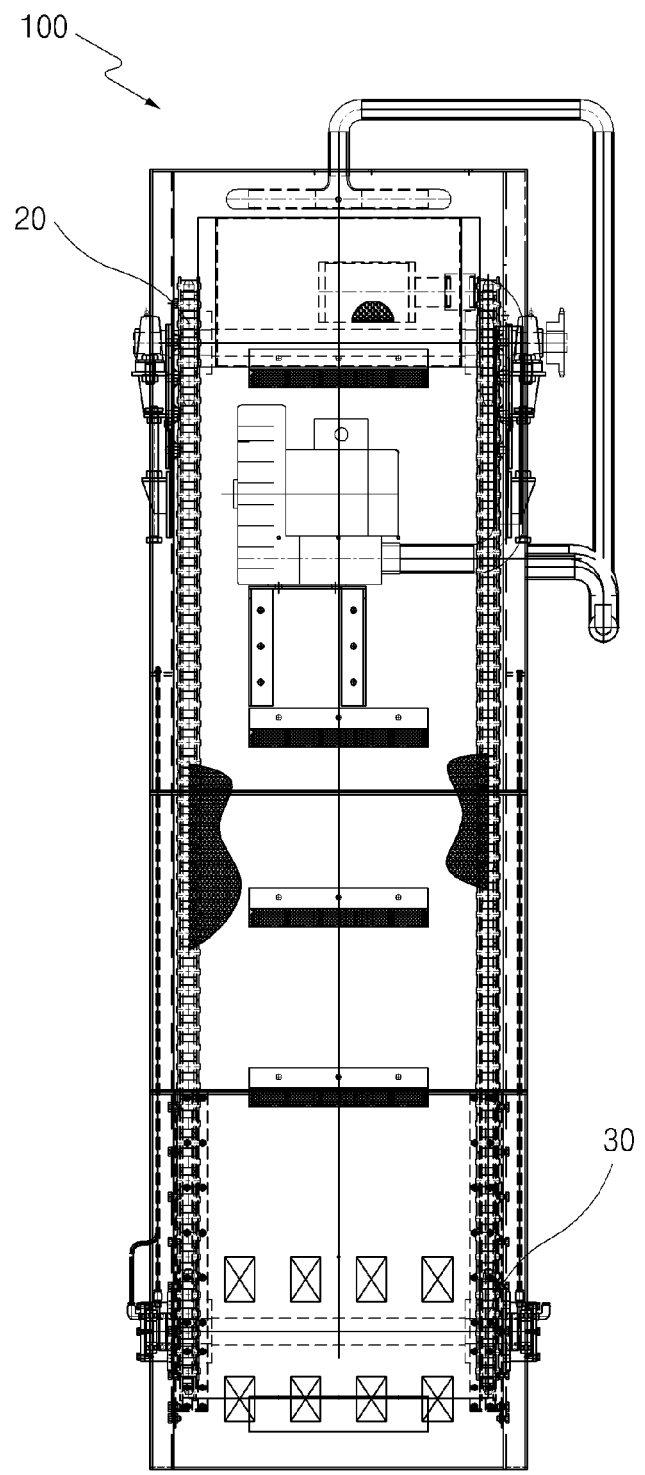
FIG. 9 is a front view illustrating another embodiment an apparatus for filtering sewage and wastewater, according to the present invention.
Figure 10:
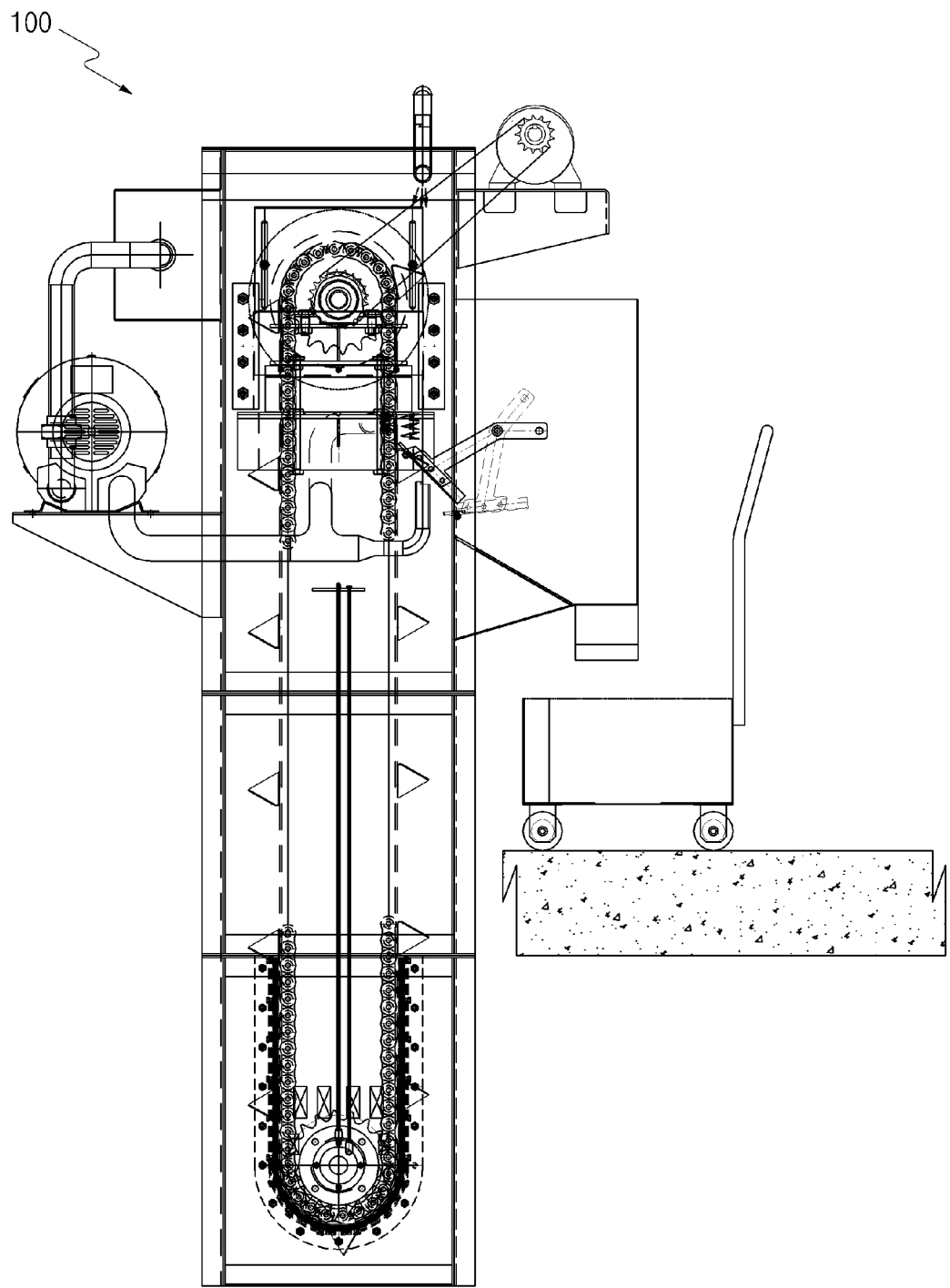
FIG. 10 is a side view of the filtering apparatus of FIG. 9.
Figure 11:
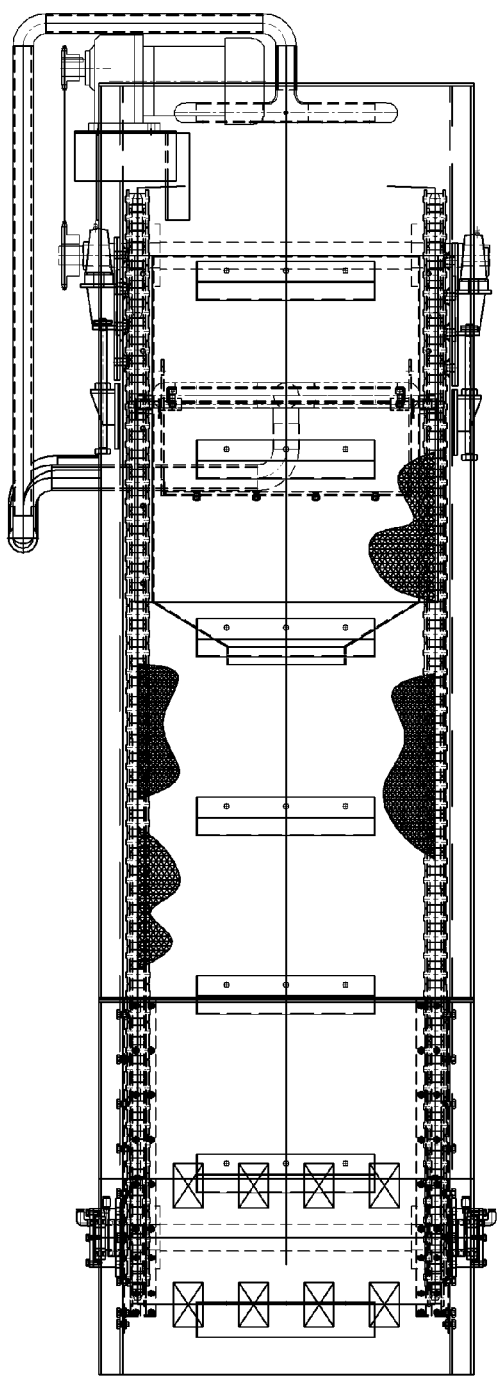
FIG. 11 is a rear view of the filtering apparatus of FIG. 9.

The filtering belt 40 may, however, tear when rotating or may not reliably receive rotating force. Therefore, to prevent the filtering belt 40 from tearing and to reliably transmit the rotating force to the filtering belt 40, the filtering apparatus 100 may be configured in such a way that the upper drive drum 20, the lower rotating drum 30 and the filtering belt 40 have a chain to facilitate their rotation. Such a structure is shown in FIGS. 9 through 11. FIG. 9 is a front view illustrating a modification of the filtering apparatus according to the present invention. FIG. 10 is a side view illustrating the modification of the filtering apparatus. FIG. 11 is a rear view illustrating the modification of the filtering apparatus. FIGS. 9 through 11 illustrate the modification of the filtering apparatus in which the upper drive drum 20, the lower rotating drum 30 and the filtering belt 40 have a chain. In this modification, because the filtering belt 40 has the chain, the tensile strength and the tension of the filtering belt 40 can be maximized.

Meanwhile, in the present invention, buckets 41 are attached to the filtering belt 40 at positions spaced apart from each other at regular intervals. The buckets 41 and the filtering belt 40 may together form a filtering component. Each bucket 41 is preferably made of a fine perforated plate or a fine filter mesh to easily separate impurities from water. Furthermore, the bucket 41 preferably has a shape that is open upwards, has a semicircular cross-section, and has a predetermined length with respect to the vertical direction, so that the bucket 41 can easily carry impurities when it moves upwards, and the impurities can be easily removed from the bucket 41 when moving downwards.

The lower rotating drum 30 is preferably configured such that it rotates at the fixed position to prevent the filtering belt 40 and the buckets 41 from being loosened or from sagging or vibrating over a predetermined level due to external impact. The upper drive drum 20 is configured such that it can be moved upwards or downwards by a fixed tension adjustment member 21 and a tension adjustment bolt 23 within a predetermined range to adjust the tension of the filtering belt 40. Therefore, the tension of the filtering belt 40 can be controlled by moving the upper drive drum 20, thus preventing the filtering belt 40 from sagging. Moreover, even when a large amount of impurities are carried by the buckets 41, the filtering belt 40 can be prevented from sagging due to the weight thereof so that the operation of carrying impurities carried out.

The upper frame 50 includes a discharge guide unit 51 that is rotatably provided on the first side surface of the upper frame 50, and a discharge guide pipe 53 through which impurities discharged by the discharge guide unit 51 pass. When each bucket 41 is moved downwards by the rotation of the filtering belt 40 after having passed over the upper drive drum 20, impurities are removed from the bucket 41 by fine impact generated when the bucket 41 collides with the rotatable discharge guide unit 51. In other words, when each bucket 41 moves downwards and collides with the discharge guide unit 51, the discharge guide unit 51 rotates backwards in a first direction around a support shaft thereof. When the bucket 41 completely passes through the discharge guide unit 51, the discharge guide unit 51 rotates forwards in a second direction around the support shaft and strikes the filtering belt 41. Then, impurities are removed from the bucket 41 by impact generated when the discharge guide unit 51 strikes the filtering belt 41. Thus, the discharge guide unit 51 may remove impurities from the filtering component (i.e., the buckets 41 and filtering belt 40). The discharge guide unit 51 may also rotate in a direction opposite to the filtering belt 40. As illustrated in FIGS. 5-6, the discharge guide unit 51 is free of any contact from the upper drive drum 20.

Furthermore, the discharge guide unit 51 includes a balance weight 52 which facilitates the rotation of the discharge guide unit 51 and maintains the weight balance thereof. In detail, the discharge guide unit 51 is rotated backwards around the support shaft by each bucket 41 of the filtering belt 40 that is moved downwards by the rotation of the upper drive drum 20. The discharge guide unit 51 that is in the state of being rotated backwards is biased forwards by the weight of the balance weight 52. When the bucket 41 is further moved downwards until the interference between the bucket 41 and the discharge guide unit 51 is removed, the discharge guide unit 51 is rotated forwards by the weight of the balance weight 52, thus striking the surface of the filtering belt 40. Furthermore, after the discharge guide unit 51 is relieved from the bucket 41 of the filtering belt 40 which is moved downwards by the rotation of the upper drive drum 20, a front end of a downward ramp member of the discharge guide unit 51 is maintained in a state of being brought into contact with the surface of the filtering belt 40 by the weight of the balance weight 52 so that the discharge guide unit 51 functions as a means for scraping out impurities from the filtering belt 40 until the following bucket 41 comes into contact with the discharge guide unit 51. The impurities scraped out from the filtering belt 40 are transferred into the discharge guide unit 51. Because the buckets 41 are provided on the filtering belt 40 at positions spaced apart from each other at regular intervals, every time each bucket 41 passes through the discharge guide unit 51 the above-mentioned process is repeated.

In the present invention, a chute housing 59 that contains the discharge guide unit 51 and the discharge guide pipe 53 may be provided on the first side surface of the upper frame 50. The chute housing 59 is configured such that an opening thereof is minimized to prevent odor from diffusing when impurities of sewage and wastewater move and are removed from the discharge guide unit 51. In addition, a rotary guide chute and a closed ramp are provided in the chute housing 59. The closed ramp functions to move impurities removed from the filtering belt 40 and the buckets 41 into a carrier 200 for collecting impurities. Furthermore, the chute housing 59 includes a slant net that removes water from impurities that fall. Water removed from the impurities is resupplied into the lower frame 70, and the impurities are sent into the carrier 200 via the discharge guide pipe 53.

Figure 12A:
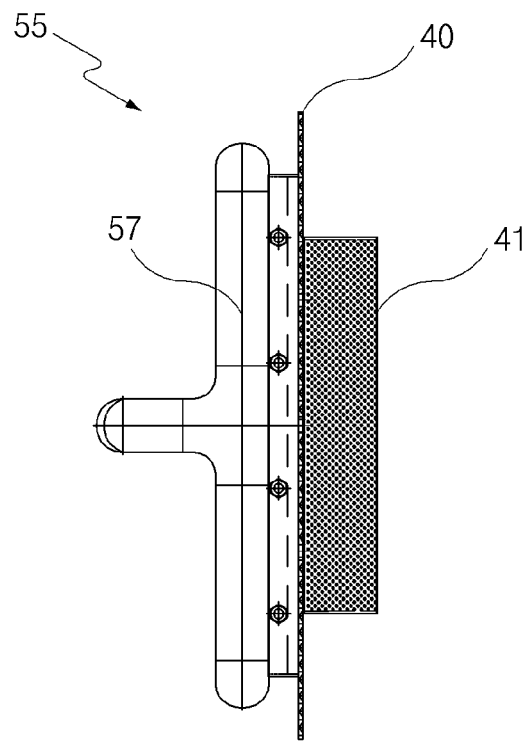
FIG. 12A illustrates an embodiment of an air blowing unit according to the present invention.
Figure 12B:
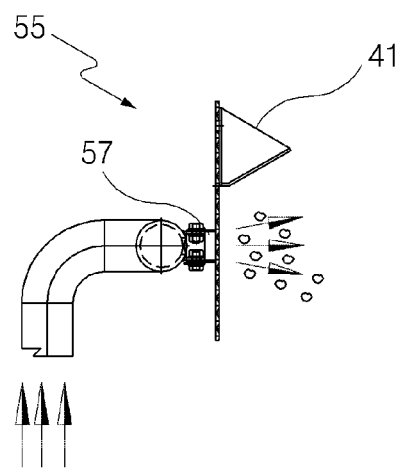
FIG. 12B is an enlarged view illustrating a portion of the embodiment of the air blowing unit according to the present invention.

Meanwhile, the filtering apparatus 100 further includes an air blowing unit 55 that is provided a second side surface of the upper frame 51 to blow air under pressure toward the filtering belt 40. The air blowing unit 55 includes a blowing nozzle 57 that discharges air blown under pressure toward the filtering belt 40 to remove the impurities from the filtering belt 40. FIG. 12A illustrates an embodiment of the air blowing unit according to the present invention. As shown in FIG. 12A, when air supplied under pressure is blown from the blowing nozzle 57 toward the filtering belt 40, impurities are removed from the bucket 41 by the blown air. FIG. 12B is an enlarged view showing a portion of the embodiment of the air blowing unit according to the present invention. The blowing nozzle 57 may be configured such that an area into which air supplied under pressure is discharged from the blowing nozzle 57 is comparatively large. Alternatively, the blowing nozzle 57 may comprise a plurality of blowing nozzles 57 each of which has a comparatively small diameter and discharges air supplied under pressure.

Preferably, the air blowing unit 55 includes a suction filter 56 and a suction pipe 58 to suck air, filter it, and supply it to the blowing nozzle 57. Thereby, clean air is supplied under pressure to the blowing nozzle 57.

As such, impurities, which are removed from the filtering belt 40 both by impact applied thereto from the discharge guide unit 51 and by air discharged from the blowing nozzle 57 of the air blowing unit 55, are sent into the discharged guide pipe 53. The impurities that have been sent into the discharged guide pipe 53 are transferred and collected into the carrier 200 that is disposed below the discharge guide pipe 53. Furthermore, the portion of the filtering belt 40 and the buckets 41 from which impurities are removed are moved downwards by the rotation of the upper drive drum 20 towards the inlet side of the lower frame 70 into which sewage and wastewater is drawn, thus repeating the process of filtering out impurities, foreign substances, earth and sand.

The lower frame 70 includes at least one opening 71 into which sewage and wastewater to be filtered is drawn. In detail, sewage and wastewater, containing impurities, earth, sand and foreign substances, is drawn into the lower frame 70 through the front opening. Sewage and wastewater passes through the filtering belt 40 and then is discharged from the lower frame 70 through a side opening. Impurities, earth, sand and foreign substances are held by the filtering belt 40 and an impurity permeation prevention seal and thus stay in the filtering apparatus. Almost all the impurities, earth, sand and foreign substances are loaded onto the buckets 41 and moved upwards. When the buckets 41 are moved upwards from the lower frame 70, water is removed from the buckets 41 through porous holes of the buckets 41 or openings of the filter mesh of the buckets 41 and falls downwards.

Furthermore, fine impurities and fine foreign substances, such as fiber yarns, are held or adhered to the filtering belt 40 and then transferred toward the upper drive drum 20. When the fine impurities and fine foreign substances are moved downwards after passing over the upper drive drum 20, they are removed from the filtering belt 40 by impact applied thereto from the discharge guide unit 51 or by air blown under pressure from the blowing nozzle 57 of the air blowing unit 55 and then fall downwards. The fine impurities and fine foreign substances that have fallen from the filtering belt 40 are collected into the carrier 200 via the discharge guide pipe 53.

Figure 13:
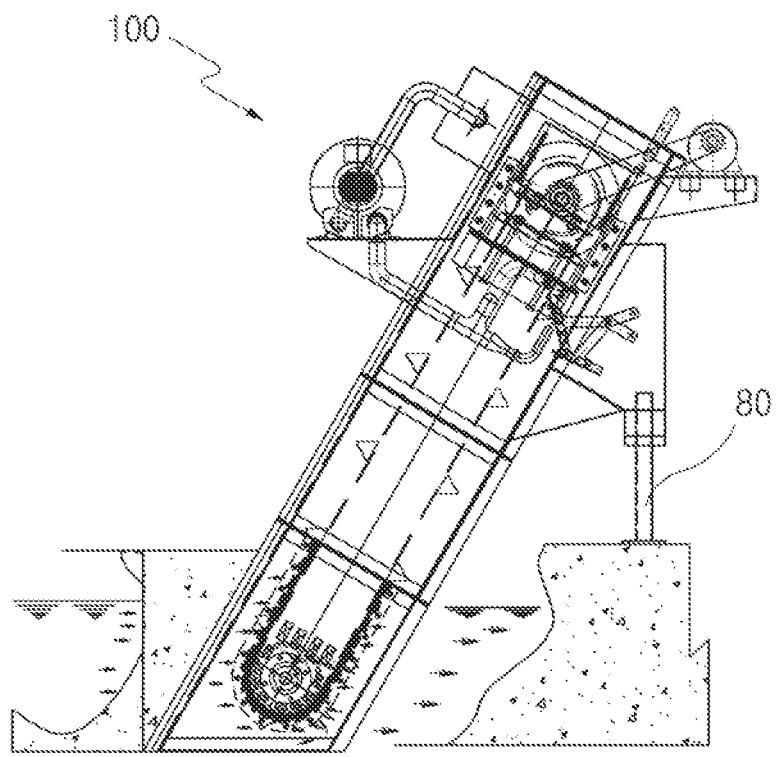
FIG. 13 illustrates an embodiment of the filtering apparatus according to the present invention that is installed in a sewage and wastewater inlet passage that is ground-level.
Figure 14:
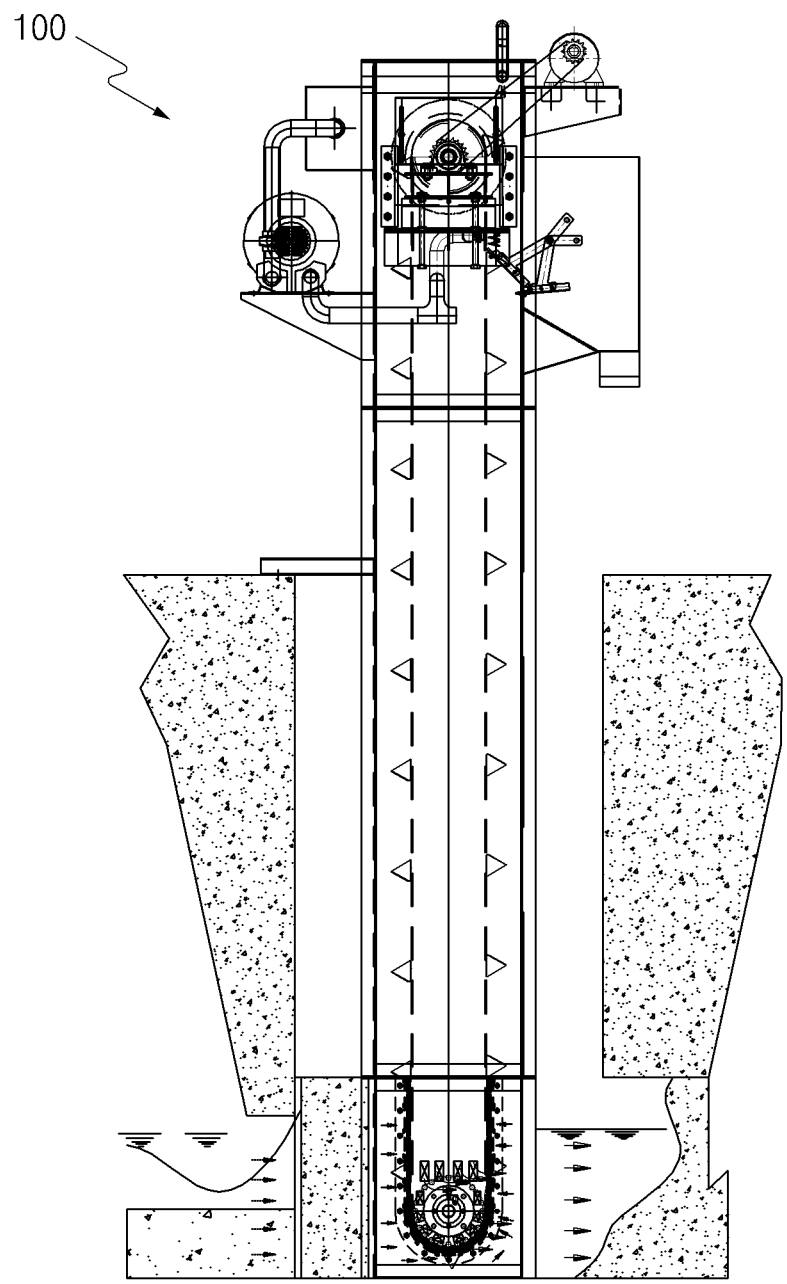
FIG. 14 illustrates an embodiment of the filtering apparatus according to the present invention that is installed in a sewage and wastewater inlet passage that is underground.

FIG. 13 illustrates an embodiment of the filtering apparatus according to the present invention that is installed in an inlet passage for sewage and wastewater that is at ground-level. FIG. 14 illustrates an embodiment of the filtering apparatus according to the present invention that is installed in an inlet passage for sewage and wastewater that is underground. Depending on the kinds and characteristics of impurities that are drawn into the inlet passage, in the case where the amount of impurities that are filtered out and collected is relatively small, as shown in FIG. 14, the filtering apparatus 100 is preferably installed in an upright position. In the case where it is required to filter out a large amount of impurities, as shown in FIG. 13, the filtering apparatus 100 is preferably inclined at a predetermined angle. In other words, the present invention is devised so that it can be used in an appropriate manner in response to the characteristics of the inlet passage for sewage and wastewater. When necessary, as shown in FIG. 13, a support 80 may be used to support the filtering apparatus 100.

As described above, an apparatus for filtering sewage and wastewater to remove fine impurities according to the present invention provides the following advantages:

First, the filtering apparatus according to the present invention can not only filter out fine impurities less than from 0.1 mm to 0.2 mm but also separate earth and sand, unlike the conventional filtering apparatuses that cannot conduct them.

Second, a filtering belt that determines the filtering performance can be replaced with another one so that the filtering belt can be selectively used in response to characteristics of sewage and wastewater drawn into the apparatus. Therefore, the size of impurities to be filtered out can be easily controlled, thus facilitating adjustment of the filtering performance.

Third, the filtering apparatus can filter out not only large impurities but also fine impurities less than from 0.1 mm to 0.2 mm and separate earth and sand without requiring a separate device.

Fourth, the filtering apparatus can be easily installed even in a sewage and wastewater inlet passage that is deeper than 4 m to 5 m underground.

Fifth, the length of the filtering apparatus can be extended by a connection frame so that it can be used at a height over 10 m on the ground or in 10 m underground. When necessary, the ground height or the underground depth of the filtering apparatus can be easily adjusted by replacing the connection frame and the filtering belt with other ones.

Sixth, in the present invention, an impact application method of a discharge guide unit and an air blowing method of an air blowing unit are used to remove impurities from the filtering belt. Thus, removal of impurities from the filtering apparatus can be facilitated.

Seventh, the filtering apparatus can be installed in the vertical direction or in an inclined direction, thus facilitating the installation process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for filtering sewage and wastewater, comprising:
   a drive motor receiving power to drive the apparatus;
   an upper drive drum operated by the drive motor;
   a lower rotating drum interlocked with the upper drive drum;
   a filter component including a filtering belt wound and rotated around the upper drive drum and the lower rotating drum; and
   a discharge guide unit provided so as to be rotatable in a first direction and a second direction opposite the first direction, the discharge guide unit for discharging impurities from the filtering component.

2. The apparatus as set forth in claim 1, wherein the drive motor comprises a decelerator for reducing a speed thereof.

3. The apparatus as set forth in claim 1, wherein the upper drive drum is movable upwards or downwards.

4. The apparatus as set forth in claim 1, wherein the upper drive drum has a chain.

5. The apparatus as set forth in claim 4, wherein the lower rotating drum has the chain.

6. The apparatus as set forth in claim 5, wherein the filtering belt has the chain.

7. The apparatus as set forth in claim 1, wherein the filtering component comprises a plurality of buckets provided at positions spaced apart from each other at regular intervals on the filtering belt, each of the buckets comprising a fine perforated plate or a fine filter mesh.

8. The apparatus as set forth in claim 7, further comprising:
   an upper frame having the upper drive drum therein;
   a lower frame having the lower rotating drum; and
   at least one connection frame connecting the upper frame to the lower frame.

9. The apparatus as set forth in claim 8, further comprising a discharge guide pipe through which the impurities discharged by the discharge guide unit pass,
   the discharge guide unit being on a first side surface of the upper frame.

10. The apparatus as set forth in claim 9, further comprising:
    an air blowing unit provided on a second side surface of the upper frame to send air under pressure.

11. The apparatus as set forth in claim 10, wherein the air blowing unit comprises:
    a blowing nozzle discharging the air sent under pressure toward the filtering belt to remove the impurities from the filtering belt.

12. The apparatus as set forth in claim 7, wherein the discharge guide unit is in direct contact with the buckets when rotating in the first direction to filter the impurities therefrom, and rotates in the second direction so as to come into contact with the filtering belt to filter the impurities therefrom.

13. The apparatus as set forth in claim 8, wherein the lower frame has at least one opening into which the sewage and wastewater, which require filtering to filter out the impurities therefrom, is drawn.

14. The apparatus as set forth in claim 8, further comprising:
    a support for supporting the apparatus.

15. The apparatus as set forth in claim 1, wherein the discharge guide unit rotates and strikes the filtering belt to remove the impurities from the filtering belt.

16. The apparatus as set forth in claim 1, wherein the discharge guide unit has at an end thereof a balance weight to bias the discharge guide unit towards the filtering belt.

17. The apparatus as set forth in claim 1, wherein the discharge guide unit is disposed so as to be free of any contact with the upper drive drum.

18. The apparatus as set forth in claim 1, wherein the filtering belt rotates in another direction that is opposite the first direction.

* * * * *